United States Patent
Jaaskelainen et al.

(10) Patent No.: US 10,370,959 B2
(45) Date of Patent: *Aug. 6, 2019

(54) FLOW SENSING IN SUBTERRANEAN WELLS

(71) Applicant: Halliburton Energy Services, Inc., Houston, TX (US)

(72) Inventors: Mikko Jaaskelainen, Katy, TX (US); Priyesh Ranjan, Houston, TX (US); Nitika Kalia, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/325,413

(22) PCT Filed: Aug. 20, 2014

(86) PCT No.: PCT/US2014/051871
§ 371 (c)(1),
(2) Date: Jan. 10, 2017

(87) PCT Pub. No.: WO2016/028288
PCT Pub. Date: Feb. 25, 2016

(65) Prior Publication Data
US 2017/0138179 A1    May 18, 2017

(51) Int. Cl.
*E21B 47/10* (2012.01)
*E21B 47/12* (2012.01)
(Continued)

(52) U.S. Cl.
CPC .......... *E21B 47/101* (2013.01); *E21B 47/102* (2013.01); *E21B 47/123* (2013.01); *G01D 5/353* (2013.01); *E21B 43/16* (2013.01)

(58) Field of Classification Search
CPC ............................. E21B 47/101; G01D 5/353
See application file for complete search history.

(56) References Cited

U.S. PATENT DOCUMENTS 3,405,770 A * 10/1968 Galle ................. E21B 7/18
175/56
4,770,080 A * 9/1988 Jivoin ................. G10D 7/02
84/330

(Continued)

FOREIGN PATENT DOCUMENTS

WO    03046333 A2    6/2003

OTHER PUBLICATIONS

International Search Report and Written Opinion for PCT Application No. PCT/US2014/051871 filed on Aug. 20, 2014. 14 pages.

*Primary Examiner* — John Fitzgerald
(74) *Attorney, Agent, or Firm* — Chamberlain Hrdlicka

(57) ABSTRACT

A flow rate sensing system can include an optical waveguide, an optical interrogator that detects optical scatter in the optical waveguide, and an emitter that produces vibration in response to flow, the optical scatter being influenced by the vibration. A method of measuring flow rate can include detecting optical scattering in an optical waveguide, the optical scattering varying in response to changes in vibration produced by an emitter, and the vibration changing in response to the flow rate changing. A well system can include at least one tubular string positioned in a wellbore, multiple locations at which fluid flows between an interior and an exterior of the tubular string, multiple emitters, each of which produces vibration in response to the flow between the interior and the exterior of the tubular string, and an optical waveguide in which optical scatter varies in response to changes in the vibration.

15 Claims, 5 Drawing Sheets

(51) Int. Cl.
*G01D 5/353* (2006.01)
*E21B 43/16* (2006.01)

(56) References Cited

U.S. PATENT DOCUMENTS

| | | | | |
|---|---|---|---|---|
| 4,922,095 A * | 5/1990 | Gergely | | G01D 5/344 |
| | | | | 250/225 |
| 5,418,335 A * | 5/1995 | Winbow | | G01V 1/02 |
| | | | | 166/177.2 |
| 5,730,219 A | 3/1998 | Tubel et al. | | |
| 7,357,021 B2 * | 4/2008 | Blacklaw | | E21B 47/0006 |
| | | | | 73/152.31 |
| 7,942,066 B1 * | 5/2011 | Stein | | G01F 1/8418 |
| | | | | 73/861.04 |
| 7,994,932 B2 * | 8/2011 | Huang | | E21B 47/182 |
| | | | | 340/853.4 |
| 7,997,340 B2 * | 8/2011 | Bostick, III | | E21B 21/08 |
| | | | | 166/250.01 |
| 8,020,616 B2 * | 9/2011 | Greenaway | | E21B 47/0007 |
| | | | | 166/250.01 |
| 8,408,064 B2 * | 4/2013 | Hartog | | E21B 47/101 |
| | | | | 73/643 |
| 8,584,519 B2 * | 11/2013 | Maida | | E21B 47/16 |
| | | | | 73/152.54 |
| 8,612,154 B2 * | 12/2013 | Hsu | | G01V 1/44 |
| | | | | 702/11 |
| 8,893,785 B2 * | 11/2014 | Skinner | | E21B 47/024 |
| | | | | 166/177.2 |
| 8,902,078 B2 * | 12/2014 | Vick, Jr. | | E21B 47/14 |
| | | | | 340/854.3 |
| 9,003,874 B2 * | 4/2015 | Samson | | E21B 47/16 |
| | | | | 73/152.54 |
| 9,222,828 B2 * | 12/2015 | Fripp | | G01H 9/004 |
| 9,279,317 B2 * | 3/2016 | Lee | | G01H 13/00 |
| 9,388,685 B2 * | 7/2016 | Ravi | | E21B 47/101 |
| 9,447,679 B2 * | 9/2016 | Xiao | | E21B 47/123 |
| 9,664,035 B2 * | 5/2017 | Nyhavn | | E21B 47/1015 |
| 9,823,373 B2 * | 11/2017 | Skinner | | G01V 1/40 |
| 2002/0174728 A1 * | 11/2002 | Beresford | | G01F 1/666 |
| | | | | 73/861 |
| 2004/0026076 A1 | 2/2004 | Goodwin et al. | | |
| 2004/0140092 A1 * | 7/2004 | Robison | | E21B 29/02 |
| | | | | 166/255.1 |
| 2004/0141420 A1 * | 7/2004 | Hardage | | E21B 47/00 |
| | | | | 367/149 |
| 2004/0194958 A1 * | 10/2004 | Mayeu | | E21B 34/14 |
| | | | | 166/255.1 |
| 2005/0067005 A1 * | 3/2005 | Van Der Spek | | E21B 28/00 |
| | | | | 136/205 |
| 2005/0195687 A1 * | 9/2005 | Woo | | H04R 1/44 |
| | | | | 367/149 |
| 2005/0224229 A1 * | 10/2005 | Blacklaw | | E21B 47/0006 |
| | | | | 166/253.1 |
| 2006/0165344 A1 * | 7/2006 | Mendez | | E21B 47/06 |
| | | | | 385/13 |
| 2007/0220976 A1 * | 9/2007 | Ewerlin | | G01N 29/036 |
| | | | | 73/579 |
| 2007/0272406 A1 * | 11/2007 | McCoy | | E21B 43/126 |
| | | | | 166/250.01 |
| 2008/0291460 A1 * | 11/2008 | Khatchaturov | | G01D 5/35383 |
| | | | | 356/478 |
| 2009/0101432 A1 * | 4/2009 | Hsu | | G01V 1/44 |
| | | | | 181/102 |
| 2009/0266533 A1 * | 10/2009 | Baajiens | | E21B 33/1208 |
| | | | | 166/66 |
| 2009/0326826 A1 * | 12/2009 | Hull | | E21B 47/1005 |
| | | | | 702/8 |
| 2010/0107754 A1 * | 5/2010 | Hartog | | E21B 47/101 |
| | | | | 73/152.47 |
| 2010/0108313 A1 * | 5/2010 | Chan | | E21B 17/20 |
| | | | | 166/263 |
| 2010/0296100 A1 * | 11/2010 | Blacklaw | | E21B 47/024 |
| | | | | 356/460 |
| 2011/0088462 A1 * | 4/2011 | Samson | | E21B 47/10 |
| | | | | 73/152.18 |
| 2011/0280103 A1 * | 11/2011 | Bostick, III | | E21B 47/101 |
| | | | | 367/35 |
| 2011/0290480 A1 * | 12/2011 | Al-Gouhi | | E21B 33/124 |
| | | | | 166/250.12 |
| 2012/0013893 A1 * | 1/2012 | Maida | | E21B 47/123 |
| | | | | 356/73.1 |
| 2012/0014211 A1 * | 1/2012 | Maida, Jr. | | E21B 47/09 |
| | | | | 367/13 |
| 2012/0111104 A1 * | 5/2012 | Taverner | | G01H 9/004 |
| | | | | 73/152.16 |
| 2012/0146805 A1 * | 6/2012 | Vick, Jr. | | G01V 11/002 |
| | | | | 340/853.2 |
| 2012/0152562 A1 | 6/2012 | Newton et al. | | |
| 2013/0104642 A1 | 5/2013 | Pelletier et al. | | |
| 2014/0126331 A1 * | 5/2014 | Skinner | | G01V 1/40 |
| | | | | 367/82 |
| 2014/0260588 A1 * | 9/2014 | Jaaskelainen | | E21B 47/101 |
| | | | | 73/152.32 |
| 2015/0021015 A1 * | 1/2015 | Xiao | | E21B 47/123 |
| | | | | 166/250.01 |
| 2015/0030187 A1 * | 1/2015 | Donaldson | | H04R 9/06 |
| | | | | 381/165 |
| 2015/0135819 A1 * | 5/2015 | Petrella | | G01V 1/40 |
| | | | | 73/152.58 |
| 2015/0323700 A1 * | 11/2015 | Jaaskelainen | | G01V 13/00 |
| | | | | 73/1.85 |
| 2016/0061003 A1 * | 3/2016 | Gottumukkala | | E21B 34/16 |
| | | | | 166/250.07 |
| 2016/0230542 A1 * | 8/2016 | Jaaskelainen | | E21B 47/101 |
| 2017/0205260 A1 * | 7/2017 | Jaaskelainen | | G01H 9/004 |
| 2017/0275986 A1 * | 9/2017 | Nunes | | G01H 9/004 |

* cited by examiner

FLOW SENSING IN SUBTERRANEAN WELLS

TECHNICAL FIELD

This disclosure relates generally to equipment utilized and operations performed in conjunction with subterranean wells and, in one example described below, more particularly provides for flow sensing with optical distributed acoustic or vibration sensing systems.

BACKGROUND

It can be beneficial to be able to measure flow rate in a well. In addition, if flow rate can be measured at multiple different locations along a wellbore, amounts of fluids being flowed into or out of the wellbore at the different locations can be determined. Such information can be used, for example, to balance production or injection along the wellbore, to prevent gas or water coning, to ensure conformance or stimulation operations are proceeding as desired, etc. Therefore, it will be appreciated that improvements are continually needed in the art of flow sensing in wells.

DETAILED DESCRIPTION

Figure 1:
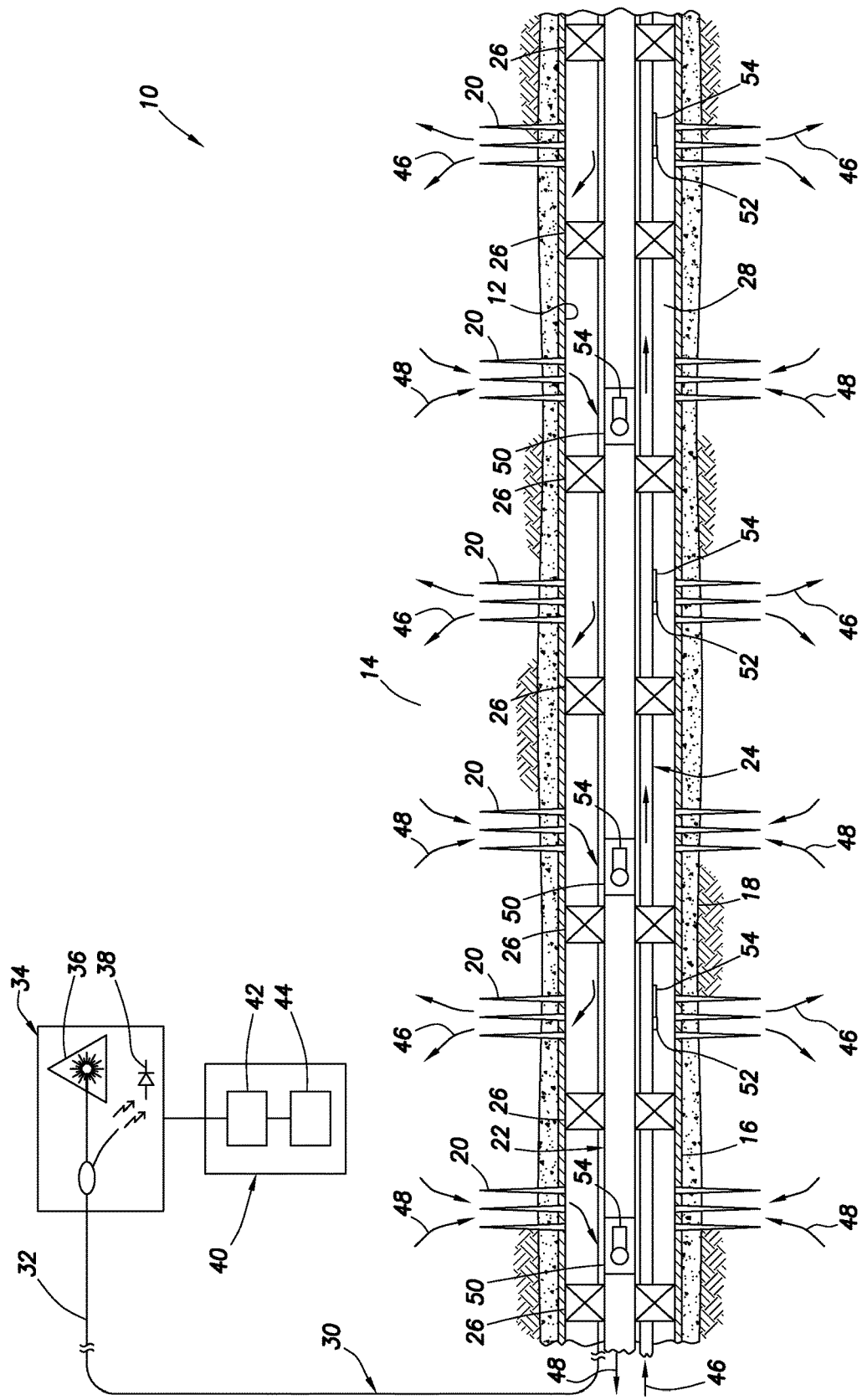
FIG. 1 is a representative partially cross-sectional view of a well system and associated method which can embody principles of this disclosure.

Representatively illustrated in FIG. 1 is a system 10 for use with a well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

As described more fully below, in the system 10 and method, emitters produce acoustic energy and/or other vibrations as fluid flows through or across the emitters. For example, a completion may have these emitters positioned at known locations where the acoustic energy and/or vibrations are detected with an optical distributed acoustic sensing (DAS) or distributed vibration sensing (DVS) system, with an optical line closely collocated with and/or coupled to the emitters.

Potential applications can include completions where liquids and/or gases are injected or produced through a controlled flow path at each of multiple locations. Examples include intelligent completions and unconventional wells, with multiple in-flow points producing simultaneously, and/or with multiple injection points. Using the principles of this disclosure, an inexpensive fit for purpose flow rate sensing system can be incorporated into an intelligent completion and/or any completion or other well installation that can accommodate the optical line and one or more emitters.

The emitters can be made out of erosion resistant materials and can be selected or configured for particular expected flow rates. The emitters can have specially configured channels with flow areas selected to control fluid flow velocity and flow regime, such that the DAS or DVS system can be used to determine flow rate based on the vibration of the optical line.

The emitters can be configured so that they direct flow past acoustic and/or vibrational generators. The flow can create a standing wave, vibration and/or acoustic energy that can be coupled to an optical waveguide interrogated by a DAS or DVS interrogator. Varying flow rates and/or multiple emitters may create a flow rate dependent acoustic and/or vibratory emission that is indicative of the flow rate.

An emitter can be made with a number of different cavities designed to generate acoustic and/or vibratory energy. Different cavities may be activated, and/or sizes of different cavities may be changed, based on the expected fluid flow rates. The cavities can be similar to flutes and/or whistles.

An emitter can be configured to direct flow through selected channels with certain flow areas to keep the flow velocity within a desired range of Reynolds numbers for a desired flow regime. The optical line can also be placed in this channel to be directly exposed to the flow. The flow would then generate acoustic energy that can be used to detect flow rate.

In the FIG. 1 example, a generally horizontal wellbore 12 penetrates an earth formation 14. The wellbore 12 is lined with casing 16 and cement 18. In other examples, the wellbore 12 could be inclined or vertical, and the principles of this disclosure could be practiced in an uncased or open hole section of the wellbore. Thus, the scope of this disclosure is not limited to any particular details of the wellbore 12 as depicted in FIG. 1 or described herein.

Perforations 20 are formed through the casing 16 and cement 18 at spaced apart locations along the wellbore 12. The perforations 20 provide for fluid communication between the wellbore 12 and the formation 14 at the spaced apart locations. In other examples, casing valves or other equipment may be used for providing fluid communication between the wellbore 12 and the formation 14.

A generally tubular production string 22 and a generally tubular injection string 24 are positioned in the wellbore 12. Packers 26 are used to isolate separate sections of an annulus 28 formed between the production string 22 and the wellbore 12.

In the FIG. 1 example, the production string 22 is centered in the packers 26 and the injection string 24 is radially offset from center, but in other examples both of the production and injection strings may be offset from center. For example, dual string packers may be used.

An optical line 30 also extends through the packers 26 and extends through the wellbore 12. The optical line 30 includes therein at least one optical waveguide 32 (such as, an optical fiber or an optical ribbon), and may include other lines (such as, electrical and/or hydraulic lines), strength members, etc.

The optical line 30 may be in the form of a cable. The optical line 30 may be armored or enclosed in a protective covering (such as, in a metal tube).

The optical line 30 could be internal or external to, or positioned in a wall of, any tubular string (such as, the casing 16, production string 22 and/or injection string 24). The scope of this disclosure is not limited to any particular form, configuration or position of the optical line 30 in a well.

In the FIG. 1 example, the optical waveguide 32 is optically connected to an optical interrogator 34. The optical interrogator 34 is depicted schematically in FIG. 1 as including an optical source 36 (such as, a laser or a light emitting diode) and an optical detector 38 (such as, an opto-electric converter or photodiode).

The optical source 36 launches light (electromagnetic energy) into the waveguide 32, and light returned to the interrogator 34 is detected by the detector 38. Note that it is not necessary for the light to be launched into a same end of the optical waveguide 32 as an end via which light is returned to the interrogator 34.

Other or different equipment (such as, an interferometer or an optical time domain or frequency domain reflectometer) may be included in the interrogator 34 in some examples. The scope of this disclosure is not limited to use of any particular type or construction of optical interrogator.

A computer 40 is used to control operation of the interrogator 34, and to record optical measurements made by the interrogator. In this example, the computer 40 includes at least a processor 42 and memory 44. The processor 42 operates the optical source 36, receives measurement data from the detector 38 and manipulates that data. The memory 44 stores instructions for operation of the processor 42, and stores processed measurement data. The processor 42 and memory 44 can perform additional or different functions in keeping with the scope of this disclosure.

In other examples, different types of computers may be used, the computer 40 could include other equipment (such as, input and output devices, etc.). The computer 40 could be integrated with the interrogator 34 into a single instrument. Thus, the scope of this disclosure is not limited to use of any particular type or construction of computer.

The optical waveguide 32, interrogator 34 and computer 40 may comprise a distributed acoustic sensing (DAS) or distributed vibration sensing (DVS) system capable of detecting acoustic or other vibratory energy as distributed along the optical waveguide. For example, the interrogator 34 can be used to measure Brillouin or coherent Rayleigh scattering in the optical waveguide 32 as an indication of acoustic or other vibratory energy as distributed along the waveguide.

In addition, a ratio of Stokes and anti-Stokes components of Raman scattering in the optical waveguide 32 could be monitored as an indication of temperature as distributed along the waveguide. In other examples, Brillouin scattering may be detected as an indication of temperature as distributed along the optical waveguide 32.

In further examples, fiber Bragg gratings (not shown) could be closely spaced apart along the optical waveguide 32, so that vibration of the waveguide will result in changes in light reflected back to the interrogator 34. An interferometer (not shown) may be used to detect such changes in the reflected light.

As depicted in FIG. 1, a fluid 46 is injected into the formation 14 via the injection string 24, and fluid 48 is produced from the formation via the production string 22. For example, the fluid 46 could be a gas, steam, heated water, combinations thereof, etc., and the fluid 48 could be oil, bitumen, asphaltenes, water, gas, combinations thereof, etc. The scope of this disclosure is not limited to any particular fluid or combination of fluids injected into, or produced from, the formation 14.

The system 10 is particularly configured to allow for simultaneous injection of the fluid 46 and production of the fluid 48 using the same wellbore 12. However, in other examples, injection and production may be alternated, or injection and production may be performed in different wellbores (such as, in a steam assisted gravity drainage (SAGD) arrangement). The scope of this disclosure is not limited to any particular injection and/or production technique or configuration, and is not limited to performing both injection and production operations.

The production string 22 includes multiple flow control devices 50 (such as, sliding sleeve valves, chokes, interval control valves, etc.) at spaced apart locations for selectively permitting fluid communication between an interior and an exterior of the production string. In the FIG. 1 example, the flow control devices 50 allow the produced fluid 48 to flow from certain sections of the annulus 28 into the production string 22.

The injection string 24 includes multiple injection ports 52 (such as, nozzles, etc.) at spaced apart locations for permitting fluid communication between an interior and an exterior of the injection string. In the FIG. 1 example, the ports 52 allow the injection fluid 46 to flow from the interior of the injection string 24 into certain sections of the annulus 28.

In the example depicted in FIG. 1, emitters 54 are incorporated into or positioned adjacent to or proximate the flow control devices 50 and injection ports 52. In this manner, the emitters 54 will produce acoustic or other vibration in response to flow of the fluids 46, 48. The vibration at each location of the emitters 54 will be detected using the optical line 30, and it will thus be possible to determine or at least estimate a flow rate of the fluids 46, 48 at each of the emitter locations.

Figure 2:
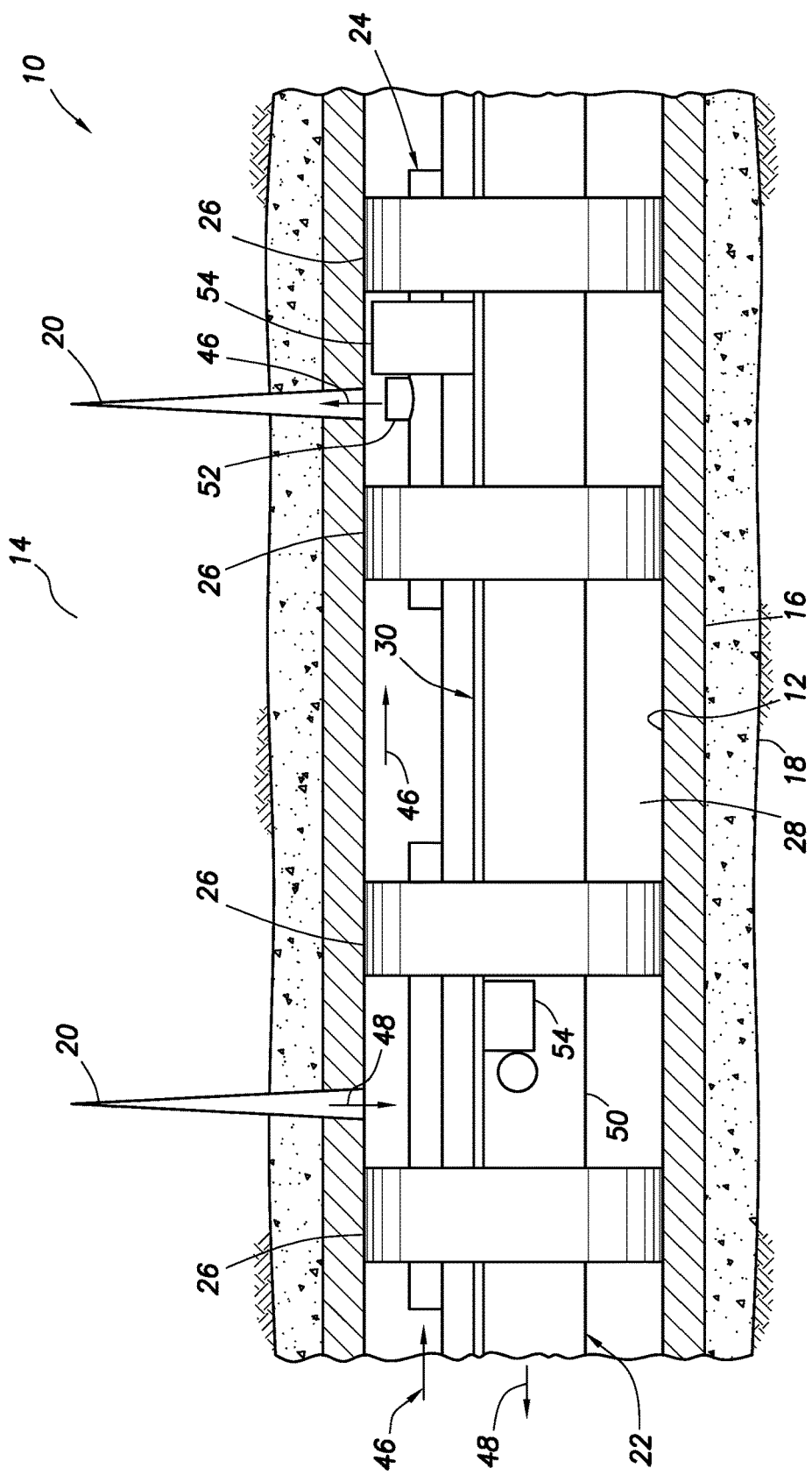
FIG. 2 is a representative partially cross-sectional view of a section of another example of the system and method.

Referring additionally now to FIG. 2, an enlarged scale partially cross-sectional view of another example of the system 10 is representatively illustrated. In this example, emitters 54 are positioned adjacent a flow control device 50 and an injection port 52. Although only one flow control device 50 and one injection port 52 are shown in FIG. 2, any number may be used in keeping with the scope of this disclosure.

As depicted in FIG. 2, the optical line 30 is in contact with each of the emitters 54. In this manner, coupling of vibration from the emitters 54 to the optical line 30 is enhanced. In some examples, the optical line 30 could extend through the emitters 54 (such as, in flow channels thereof) for enhanced vibration coupling, or to allow the optical waveguide 32 (see FIG. 1) to be directly vibrated by the flow through the emitters.

Note that, in the FIG. 2 example, the injection string 24 is not continuous, but is instead made up of separate sections. In addition, isolated sections of the annulus 28 serve as conduits to flow the injection fluid 46 between the sections of the injection string 24. Thus, it will be appreciated that the scope of this disclosure is not limited to any particular configuration of the system 10.

Figure 3:
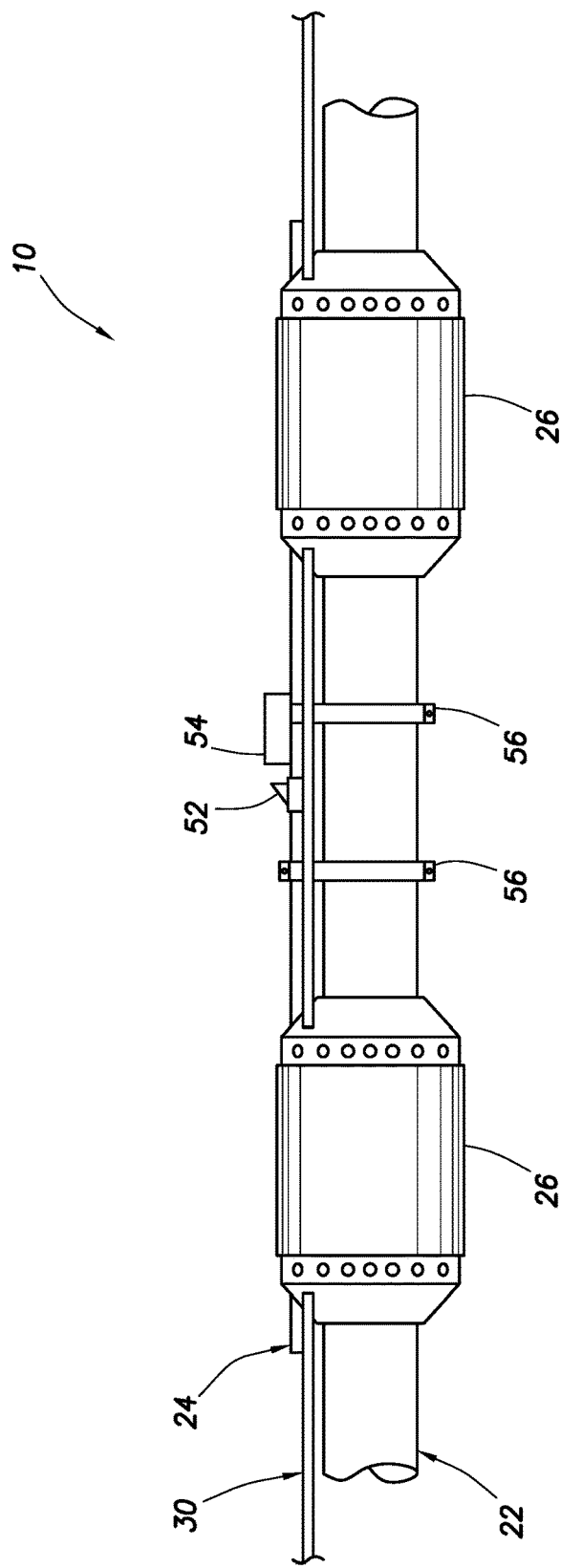
FIG. 3 is a representative side view of an injector section of another example of the system and method.

Referring additionally now to FIG. 3, a more detailed side view of an injection section of the system 10 is representatively illustrated. In this view, a manner in which the injection string 24, the optical line 30 and emitter 54 can be clamped to the production string 22 is depicted. Specifically, clamps 56 may be used for this purpose.

Figure 4:
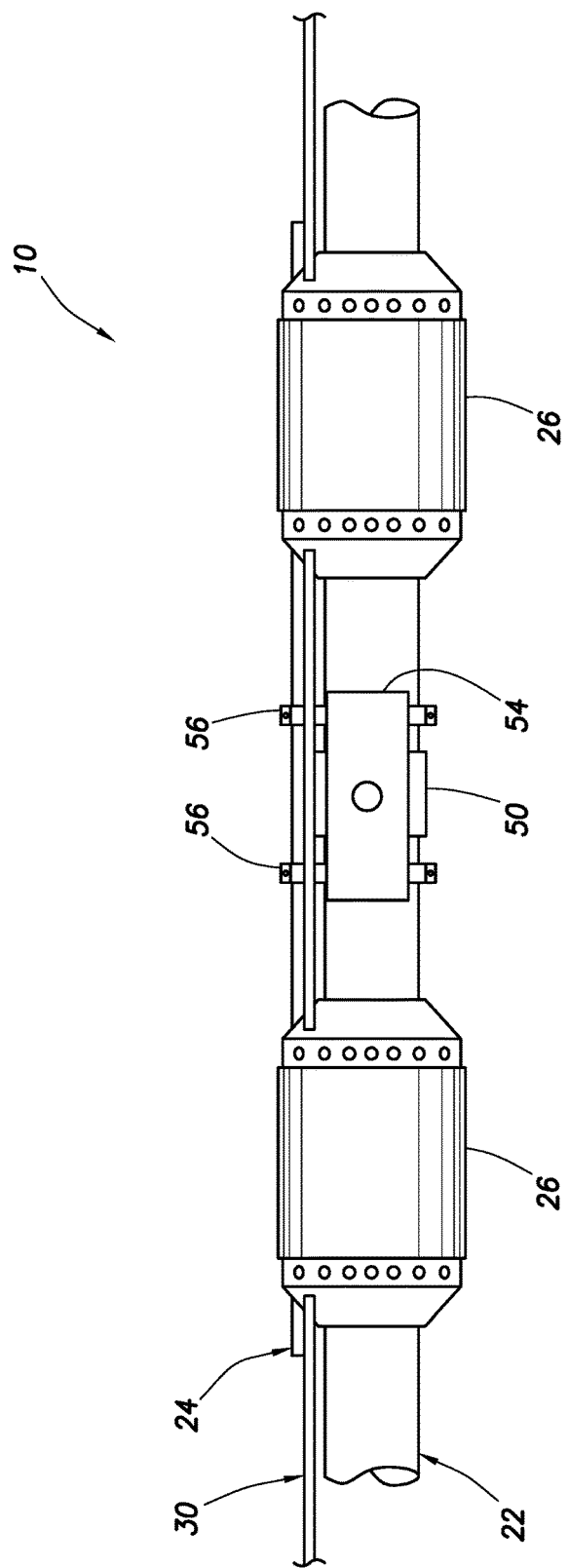
FIG. 4 is a representative side view of a production section of the system and method of FIG. 3.

Referring additionally now to FIG. 4, a more detailed side view of a production section of the system 10 is representatively illustrated. In this view, it may be seen that similar clamps 56 may be used to clamp the injection string 24, the optical line 30 and emitter 54 to the production string 22.

However, use of the clamps 56 is not necessary in keeping with the principles of this disclosure.

Figure 5:
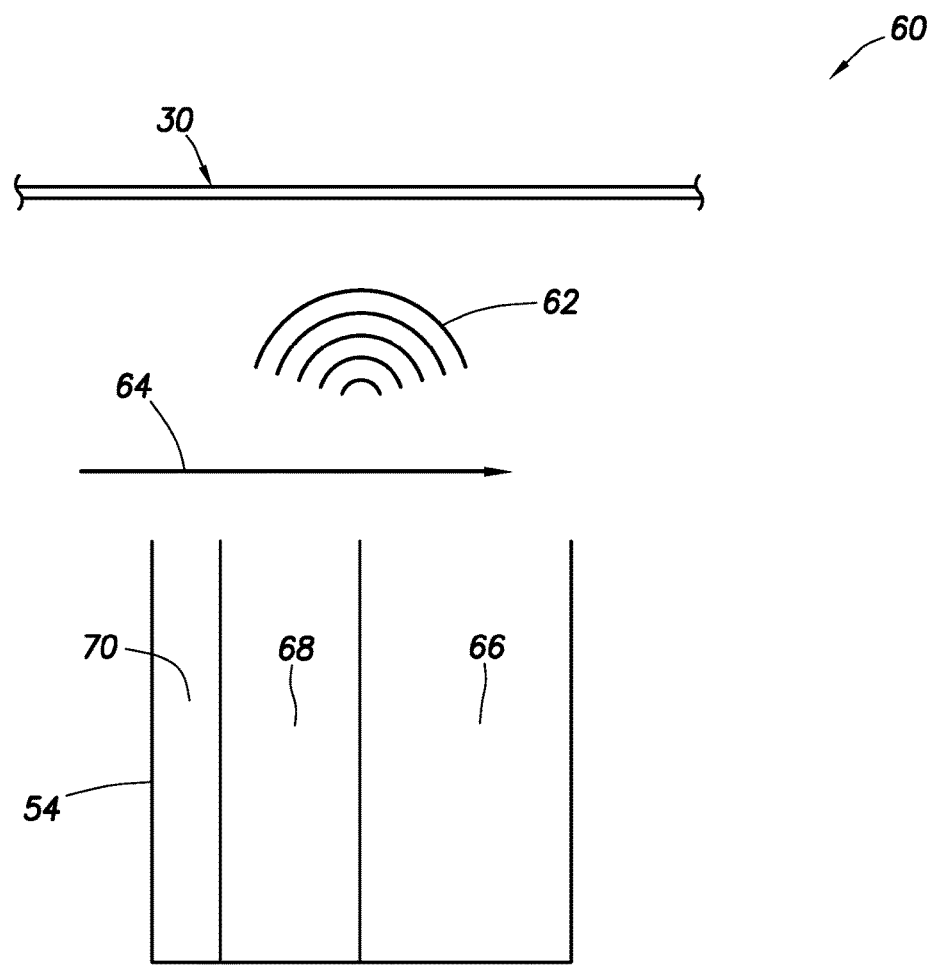
FIG. 5 is a representative schematic view of an emitter and an optical line that may be used for flow rate sensing in the system and method.

Referring additionally now to FIG. 5, a flow rate sensing system 60 that may be used with the well system 10 and method described above is representatively illustrated. However, the flow rate sensing system 60 may be used with other systems and methods, and other configurations of flow rate sensing systems may be used, in keeping with the principles of this disclosure.

In the flow rate sensing system 60 of FIG. 5, the optical line 30 is positioned in a same wellbore, adjacent, proximate or in contact with, the emitter 54. The emitter 54 produces vibration 62 in response to fluid flow 64 across or through the emitter. For example, in the system 10 examples of FIGS. 1-4, the flow 64 could comprise flow of the injection or production fluids 46, 48.

The vibration 62 has at least one parameter that corresponds to a rate of the flow 64. For example, an amplitude and/or a frequency of the vibration 62 could correspond to a rate of the flow 64. In one example, the amplitude and/or the frequency could increase in response to an increase in the rate of the flow 64.

In the FIG. 5 example, the emitter 54 has multiple chambers 66, 68, 70. Each of the chambers 66, 68, 70 has a resonant frequency. For example, a longer or larger chamber 66 can have a lower resonant frequency as compared to a shorter or smaller chamber 70.

When the flow 64 passes across the chambers 66, 68, 70, one or more of the chambers can vibrate at its resonant frequency (or a harmonic frequency), depending on the rate or velocity of the flow. The chambers 66, 68, 70 can be configured or selected, so that they produce detectable vibrations at expected downhole conditions, flow rates, etc. Similarly, the emitter 54 can be configured with appropriately sized channels, flow passages, etc., so that the flow 64 has an appropriate rate or velocity to produce detectable vibrations from the chambers 66, 68, 70.

Note that the emitter 54 example of FIG. 5 is merely illustrative of one way in which the vibration 62 may be produced, and a large variety of other ways are possible in keeping with the scope of this disclosure. For example, bluff bodies, vortex shedding structures, vanes, and any other type of structure or device may be used to produce the vibration 62.

It may now be fully appreciated that the above disclosure provides significant advancements to the art of flow sensing in wells. In some examples described above, a flow rate of fluid produced from or injected into the formation 14 can be conveniently measured using a distributed acoustic or vibration sensing system. Such flow rate measurement can be performed at multiple locations along the wellbore 12, thereby enabling injection and/or production parameters to evaluated, and adjusted if desired.

In particular, the above disclosure provides to the art a flow rate sensing system 60 for use with a subterranean well. In one example, the system 60 can comprise: an optical waveguide 32 extending in the well, an optical interrogator 34 that detects optical scatter in the optical waveguide 32, and an emitter 54 that produces vibration 62 in response to flow 64 in the well, the optical scatter in the optical waveguide 32 being influenced by the vibration 62.

A frequency and/or an amplitude of the vibration 62 may vary in response to a change in a rate of the flow 64.

The optical waveguide 32 may be included in an optical line 30 that is in contact with the emitter 54.

The vibration 62 may comprise acoustic waves.

The emitter 54 may comprise multiple chambers 66, 68, 70, each of the chambers having a different resonant frequency.

The emitter 54 may produce the vibration 62 in response to the flow 64 into a tubular string 22. The emitter 54 may produce the vibration 62 in response to the flow 64 out of a tubular string 24.

Also provided to the art by the above disclosure is a method of measuring flow rate in a subterranean well. In one example, the method can comprise: detecting optical scattering in an optical waveguide 32 positioned in the well, the optical scattering varying in response to changes in vibration 62 produced by an emitter 54 in the well, and the vibration 62 changing in response to the flow rate changing.

Flow past at least one cavity 66, 68, 70 of the emitter 54 may produce the vibration 62 at a resonant frequency of the cavity. The "at least one" cavity can comprise multiple cavities 66, 68, 70, the resonant frequency being different for each of the cavities.

A well system 10 is also described above. In one example, the well system 10 can comprise: at least one tubular string 22, 24 positioned in a wellbore 12, multiple locations at which fluid 46, 48 flows between an interior and an exterior of the tubular string, multiple emitters 54, each of which produces vibration 62 in response to the flow between the interior and the exterior of the tubular string 22, 24, and an optical waveguide 32 in which optical scatter varies in response to changes in the vibration 62.

Each of the emitters 54 may be positioned at a respective one of the locations, and at each of the locations the flow between the interior and exterior of the tubular string 22, 24 can pass through a respective one of the emitters. The optical waveguide 32 may be included in an optical line 30 in contact with each of the emitters 54.

The "at least one" tubular string may comprise a production tubular string 22 and an injection tubular string 24. A first set of the emitters 54 can produce the vibration 62 in response to the flow out of the injection tubular string 24, and a second set of the emitters 54 can produce the vibration 62 in response to the flow into the production tubular string 22.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A flow rate sensing system for use with a subterranean well, the system comprising:
    an optical waveguide extending in the well; an optical interrogator that detects optical scatter in the optical waveguide; and
    a multi-chamber emitter that produces vibration at a resonance frequency of a chamber of the multi-chamber emitter in response to a transverse flow across each chamber of the multi-chamber emitter simultaneously, the optical scatter in the optical waveguide being influenced by the vibration, wherein each chamber of the multi-chamber emitter has a uniform length and a cross-sectional area that is different than the remaining chambers, and the chamber of the multi-chamber emitter that produces the resonance frequency vibration varies based on a flow rate of the flow across the multi-chamber emitter.

2. The system of claim 1, wherein a frequency of the vibration varies in response to a change in a rate of the flow.

3. The system of claim 1, wherein an amplitude of the vibration varies in response to a change in a rate of the flow.

4. The system of claim 1, wherein the optical waveguide is included in an optical line that is in contact with the emitter.

5. The system of claim 1, wherein the vibration comprises acoustic waves.

6. The system of claim 1, wherein the emitter produces the vibration in response to the flow into a tubular string.

7. The system of claim 1, wherein the emitter produces the vibration in response to the flow out of a tubular string.

8. A method of measuring flow rate in a subterranean well, the method comprising:
    detecting optical scattering in an optical waveguide positioned in the well;
    flowing fluid transversely across each chamber of a multi-chamber emitter positioned within the well simultaneously to produce vibration at a resonance frequency of a first chamber of the multi-chamber emitter, wherein a length of each chamber is uniform and a cross-sectional area of each chamber is different than the remaining chambers, and the chamber of the multi-chamber emitter that produces the resonance frequency vibration varies based on a flow rate of the flow across the multi-chamber emitter;
    the optical scattering varying in response to the vibration produced by the emitter; and
    determining a flow rate of the fluid based on the variation of the optical scattering.

9. The method of claim 8, wherein the vibration comprises acoustic waves.

10. The method of claim 8, wherein the emitter produces the vibration in response to flow into a tubular string in the well.

11. The method of claim 8, wherein the emitter produces the vibration in response to flow out of a tubular string in the well.

12. The method of claim 8, wherein an amplitude of the vibration varies in response to a change in the flow rate.

13. A well system, comprising:
    at least one tubular string positioned in a wellbore;
    multiple locations at which fluid flows between an interior and an exterior of the tubular string;
    multiple multi-chamber emitters, each multi-chamber emitter producing vibration at a resonance frequency of a chamber of the respective multi-chamber emitter in response to a transverse flow across each chamber of the respective multi-chamber emitter simultaneously, wherein the respective chambers of each multi-chamber emitter having a uniform length and a cross-sectional area that is different than the remaining chambers, and the chamber of each multi-chamber emitter that produces the resonance frequency vibration varies based on a flow rate of the flow across the respective multi-chamber emitter; and
    an optical waveguide in which optical scatter varies in response to the resonance frequency vibrations.

14. The system of claim 13, wherein the optical waveguide is included in an optical line in contact with each of the emitters.

15. The system of claim 13, wherein the at least one tubular string comprises a production tubular string and an injection tubular string, and wherein a first set of the emitters produce the vibration in response to the flow out of the injection tubular string and a second set of the emitters produce the vibration in response to the flow into the production tubular string.

* * * * *